June 11, 1963

M. TARASEVICH 3,093,760

COMPOSITE PIEZOELECTRIC ELEMENT

Filed June 15, 1960

INVENTOR.
MICHAEL TARASEVICH
BY
Raymond A. Paquin
ATTORNEY.

United States Patent Office 3,093,760

Patented June 11, 1963

3,093,760

COMPOSITE PIEZOELECTRIC ELEMENT

Michael Tarasevich, Glen Cove, N.Y., assignor to American Bosch Arma Corporation, a corporation of New York Filed June 15, 1960, Ser. No. 36,375
5 Claims. (Cl. 310—9.1)

The present invention relates to flexure mode vibrating elements and has particular reference to mounting means therefor and manufacture thereof.

There are many uses for piezoelectric vibrators whose resonant frequency can be varied in a controlled and predictable manner by the application of tension forces to the piezoelectric material. In the present instance, the vibrators under consideration are of the flexure length-thickness mode or bender type which are vibrated in the fundamental mode (at the lowest natural frequency) and are supported at the nodal lines for free end vibration.

Difficulties have been experienced in properly mounting the vibrators in the past. For example, conventional type bender crystals employ fragile wires soldered to the crystal faces. The disadvantages of this scheme are that the wires tend to degrade the crystal Q due to misalignment and overlapping of the crystal nodal lines. Also severe energy losses are attributable to the fact that the wire joint is displaced by a finite amount from the true nodal line i.e. by one half the total crystal thickness. Work must be done by the crystal to stretch or compress the support wires and this represents energy lost to the crystal. In addition, the wire to crystal joints are notoriously weak mechanically and are subject to creep and catastrophic failure at low stress levels. Also, components of the tensile force applied through the wires stress the central bond (because the wires are not parallel to the crystals) thereby tending to split the crystal mechanically at the bond.

Other mounting means have been tried, such as inserting mechanical wires at the nodal lines for support but this has required precision drilling through the piezoelectric material and has not been entirely successful.

The present invention involves the use of a metallic foil at the neutral axis of the bender. For this purpose, a pair of length vibration piezoelectric elements are bonded to both sides of a metal foil, longer and wider than the elements. The foil is cut away at the ends of the piezoelectric elements up to the nodal lines so as to permit unhindered flexure of the ends of the bar. Tension applied to the ends of the foil apply tension to the piezoelectric elements at the neutral axis of the composite structure.

By way of contrast to earlier mounting methods, the present invention has the following advantages: The material and dimensions of the foil may be selected to operate at lower stress levels than the wire supports thereby affording greater protection against creep, instability and failure. The foil lies on the neutral axis and is eliminated as a source of mechanical instability since the stresses during crystal vibration are substantially zero. The tension transmitting beams are integral with the center foil and form a true nodal line support since they act as hinged beams, with the hinge on the neutral axis at the true nodal line. Electrically, the foil may be grounded to act as a shield and to reduce the effects of shunt crystal capacitance.

For a more complete understanding of this invention, reference may be had to the accompanying diagrams, in which FIGURE 1 is a plan view of the bender of this invention;

Figure 1:
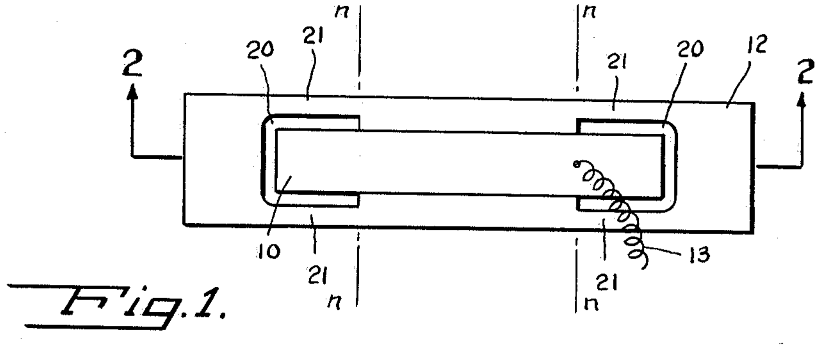
Figure 2:
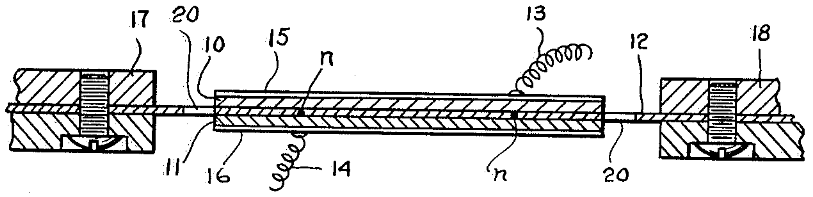
FIGURE 2 is a cross sectional view through 2—2 of FIGURE 1.

With reference now to the figure, piezoelectric plates 10, 11 are bonded to both sides of a thin metallic sheet or foil 12. The piezoelectric plates are preferably X cut, length extension mode quartz crystals, although not limited thereto, so that with plates which experience opposing dimensional change under the influence of an electric field the composite structure bends into an art. For example the plates 10, 11 will experience opposing dimensional changes if like faces of the same cut crystals are attached to the foil 12 and the electric field is connected across the plates 10, 11, or, alternatively, if unlike faces are attached to the foil 12 and the electric field is applied between the foil 12 and each of the plates 10, 11. Upon application of an alternating electric field the composite structure will vibrate and if the piezoelectric plates are used to control the frequency of the applied electric field as well, the structure will vibrate at its resonant frequency. In the fundamental free-free mode of vibration the structure bends about a pair of nodal lines *n—n* in the figures, the position of which can be mathematically determined from the dimensions and characteristics of the materials in accordance with well known theory.

Mounting of the composite piezoelectric structure must be accomplished as close as possible to the nodal lines *n—n* for maximum efficiency which are internal of the composite structure i.e., at the central plane. Prior means have depended upon attaching of mechanically strong electrical leads 13, 14 to the outer surfaces 15, 16 of the plates 10, 11 by soldering for example, but these have not proven satisfactory for the many reasons explained earlier. Attempts have also been made to cut through the piezoelectric material to get the supports closer to the actual nodal lines (which are at the central plane of the foil 12) without real success.

In the present invention the metallic foil 12 is longer and wider than the plates 10, 11. The ends of the foil 12 are held in clamps 17 and 18 which may be movable with respect to each other so as to vary the tension in the foil 12. The foil 12 has cutouts 20 at both ends of the plates 10, 11 so as to permit unhindered vibration of the ends of the plates 10, 11. The plates 10, 11 are coated with metallic films 15, 16 to which very compliant electrical leads 13, 14 are attached, not necessarily as close as physically possible to the nodal lines but preferably so. Furthermore, the electrical leads 13, 14 may be designed to have a mechanical resonant frequency substantially the same as the resonant frequency of the piezoelectric structure to minimize losses. On the other hand, the electric leads may be evaporated on an insulating coating applied to the crystal and foil or made by printed circuit techniques.

Figure 3:
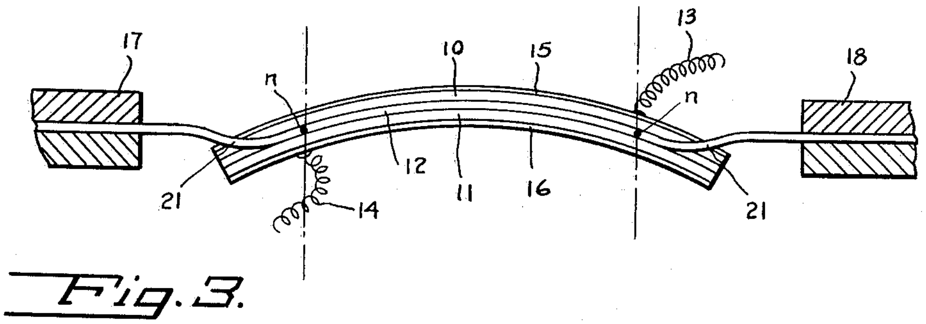
FIGURE 3 is a side view of the bender of FIGURE 1 at one time during vibration.

The cutout of the foil 12, extends from the nodal lines *n—n* outward and leaves a space in the foil 12 wherein the ends of the plates 10, 11 are free to move. Upon application of an electric field to the leads 13, 14 the composite structure bends, as in FIGURE 3 for example, where the piezoelectric plates 10, 11 flex into an arc carrying the metallic foil 12 into the curvature shown. The flexure in FIGURE 3 is magnified many times over the actual displacement experienced by the plates 10, 11. The flexure of the foil 12 and plates 10, 11 "hinges" about the juncture of the beams 21 (which are formed in the foil 12 by the cutouts 20) and the uncut central portion of foil 12, and this juncture is located as closely as possible to the nodal line *n—n*. To reduce loss of energy through the beams, the length of the cutout 20 is designed for resonant vibration of beams 21 at the natural frequency of the vibrating structure 10, 11, 12 and for reflection of energy back to the vibrating structure.

It should be realized that in the unstressed condition, nodal lines are located a distance of approximately .224 of the total length of the bar from the end. This ratio holds true for all lengths and thicknesses, these properties determining the resonant frequency of the device. As the foil 12 is placed under tension, thereby stressing the plates 10, 11, the nodal line *n—n* is displaced toward the ends of the bar. The excursion of the nodal line is very minute, and adequate efficiency may be obtained simply by using the .224 figure.

Some changes may be made in the physical embodiment by those skilled in the art without departing from the spirit of the invention as set forth in the appended claims.

I claim:

1. In a device of the character described, a metal foil, piezoelectric material bonded to each side of said foil, said foil being longer and wider than said piezoelectric material, a portion of the foil adjacent the end of said piezoelectric material between the side edges and within the end of said foil being removed.

2. In a device of the character described, metallic foil, length-thickness mode vibration piezoelectric material bonded to each side of said foil to form a bender type vibrator, said foil being longer and wider than said piezoelectric material, a portion of the foil adjacent the end of said piezoelectric material as far as the nodal line thereof and between the side edges and within the end of said foil being removed.

3. In a device of the character described, a pair of spaced supports, a metal foil connected adjacent its opposite ends to said supports, a piezoelectric member bonded to said foil, said foil being longer and wider than said piezoelectric material, a portion of the foil adjacent the end of said piezoelectric material as far as the nodal line thereof and between the side edges and within the end of said foil being removed.

4. In a device of the character described, a pair of spaced supports, a metal foil connected adjacent its opposite ends to said supports, a piezoelectric member secured to said foil, said foil being longer and wider than said piezoelectric material, a portion of the foil adjacent the end of said piezoelectric material as far as the nodal line thereof and between the side edges and within the end of said foil being removed.

5. In a device of the character described, a pair of relatively movable spaced supports, a metal foil connected adjacent its opposite ends to said supports, a piezoelectric member secured to said foil, said foil being longer and wider than said piezoelectric material, a portion of the foil adjacent the end of said piezoelectric material as far as the nodal line thereof and between the side edges and within the end of said foil being removed.

References Cited in the file of this patent

UNITED STATES PATENTS

| | | |
|---|---|---|
| 2,916,578 | Crownover | Dec. 8, 1959 |
| 2,953,696 | Ruggles | Sept. 20, 1960 |